US 6,669,293 B2

(12) United States Patent  (10) Patent No.: US 6,669,293 B2
Moore  (45) Date of Patent: Dec. 30, 2003

(54) ANTI-VIBRATION SEAT FOR RIDING MOWER

(75) Inventor: Jeffrey J. Moore, Beatrice, NE (US)

(73) Assignee: White Consolidated Industries, Inc., Cleveland, OH (US)

(*) Notice: Subject to any disclaimer, the term of this patent is extended or adjusted under 35 U.S.C. 154(b) by 0 days.

(21) Appl. No.: 09/907,157

(22) Filed: Jul. 17, 2001

(65) Prior Publication Data

US 2002/0008418 A1 Jan. 24, 2002

Related U.S. Application Data

(60) Provisional application No. 60/219,521, filed on Jul. 20, 2000.

(51) Int. Cl.[7] .................................................. B60N 2/38
(52) U.S. Cl. ........................ 297/335; 297/336; 280/781
(58) Field of Search .......................... 280/781; 297/335, 297/336, 188.09, 188.1, 216.16; 248/286.1, 285.1, 618, 632

(56) References Cited

U.S. PATENT DOCUMENTS

| | | | | |
|---|---|---|---|---|
| 1,471,001 A | * | 10/1923 | Nicholson | 297/335 |
| 1,880,497 A | * | 10/1932 | Saunders et al. | 297/335 |
| 3,189,312 A | * | 6/1965 | Bilancia | 297/335 |
| 3,542,325 A | * | 11/1970 | Schwenk | 297/335 X |
| 3,572,816 A | | 3/1971 | Brown | |
| 3,827,747 A | * | 8/1974 | Cookes | 297/335 X |
| 4,364,602 A | * | 12/1982 | Rigazio | 297/335 X |
| 4,395,011 A | * | 7/1983 | Torta | 297/335 X |
| 4,565,407 A | * | 1/1986 | Brautigam | 297/335 |
| 4,696,508 A | * | 9/1987 | Brautigam | 297/335 X |
| 4,742,984 A | * | 5/1988 | Cote et al. | |
| 4,930,593 A | | 6/1990 | Swartzendruber et al. | |
| 5,230,544 A | * | 7/1993 | Morritt et al. | 297/336 X |
| 5,257,852 A | * | 11/1993 | Tsuneki et al. | 297/335 X |
| 5,496,088 A | * | 3/1996 | Stewart | 297/336 X |
| 5,711,505 A | * | 1/1998 | Nemoto | 297/336 X |
| 5,911,471 A | * | 6/1999 | Benedict et al. | 297/188.09 X |
| 5,951,086 A | * | 9/1999 | Hoshino et al. | 297/336 X |
| 6,193,297 B1 | * | 2/2001 | Vandermolen | 297/216.16 X |
| 6,234,574 B1 | * | 5/2001 | Hoshihara et al. | 297/336 |
| 6,250,842 B1 | * | 6/2001 | Kruger | 297/335 X |
| 6,257,663 B1 | * | 7/2001 | Swierczewski | 297/216.16 X |
| 6,283,550 B1 | * | 9/2001 | Vialatte et al. | 297/335 |
| 6,431,632 B1 | * | 8/2002 | Kozikowski et al. | 297/336 X |

* cited by examiner

*Primary Examiner*—Rodney B. White
(74) *Attorney, Agent, or Firm*—Pearne & Gordon LLP

(57) ABSTRACT

An apparatus for reducing the vibration in the seat of a riding mower. The apparatus reduces the amount of vibration transferred from a mower frame to the seat. The device includes a mower frame, bracket, seat frame and isolators. Isolators separate the mower frame from the mower seat. Additionally, the bracket secures the mower seat to the mower frame in a manner such that the vertical components of vibration in the mower frame are not transmitted through the bracket.

17 Claims, 3 Drawing Sheets

ANTI-VIBRATION SEAT FOR RIDING MOWER

This application claims the benefit of U.S. Provisional Patent Application Serial No. 60/219,521 filed Jul. 20, 2000.

BACKGROUND OF THE INVENTION

This invention relates generally to mower seats, and more specifically, to a lawn mower seat that reduces the transmission of vibrations from the mower to the operator.

DESCRIPTION OF THE RELATED ART

Various mower seat configurations have been developed to increase operator comfort and to reduce fatigue of the operator.

U.S. Pat. No. 3,572,816 discloses an arcuate seat for riding implements, which extends transversely to the direction of travel of the implement, whereby a rider may change sitting positions along the seat when the implement moves over a non-horizontal surface.

U.S. Pat. No. 4,930,593 discloses a pivoting seat structure for a front mounted mower that includes a main support plate pivotally connected to the lower frame for rotation about a first transverse axis and a seat including a mounting plate connected to the support plate for rotation about a second transverse axis offset in the fore-and-aft direction from the first axis.

These prior art devices typically use damping devices between the seat and the mower. However, these devices still have points of contact between the seat and the mower frame, which directly transmit mower vibrations. Accordingly, there is a need for an improved mower seat, which eliminates direct contact between the seat and the mower frame so that the vibration can be dampened before received by the seat. Further, there is a need for the improved mower seat that is simple in design and inexpensive to produce.

SUMMARY OF THE INVENTION

The object of this invention is to provide an anti-vibration seat for a riding mower.

More specifically, the invention is directed towards an anti-vibration seat including a bracket, seat frame and isolators.

According to the invention, the bracket is fixedly attached to the mower frame. The seat frame is pivotally and slidably attached to the bracket so that the seat frame is vertically separated from the bracket when the seat frame is in a sitting position.

In accordance with an embodiment of the invention, the isolators have a lower end fixedly attached to the mower frame and an upper frame engageable with the seat frame.

It is therefore an aspect of the present invention to provide more comfort to the operator by reducing the vibration in the seat.

It is yet a further aspect of the present invention to provide a seat frame that floats in pivot slots and rests on isolators rather than the seat frame being mounted directly to the mower frame.

These and other aspects of this invention are illustrated in the accompanying drawings, and are more fully disclosed in the following specification.

DETAILED DESCRIPTION OF THE DRAWINGS

DETAILED DESCRIPTION OF THE PREFERRED EMBODIMENTS

Figure 1:
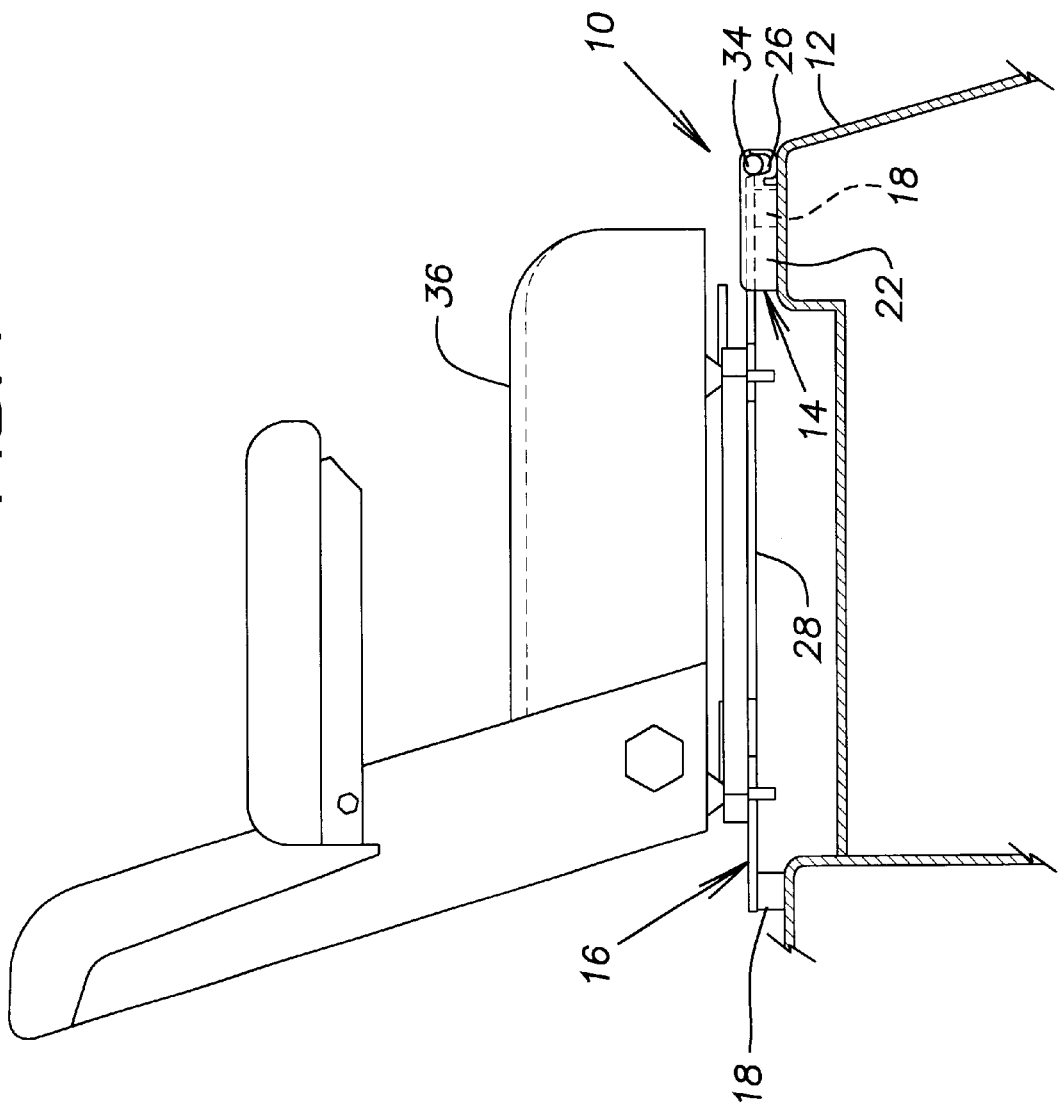
FIG. 1 is a side view of the anti-vibration seat in a sitting position according to the present invention.
Figure 2:
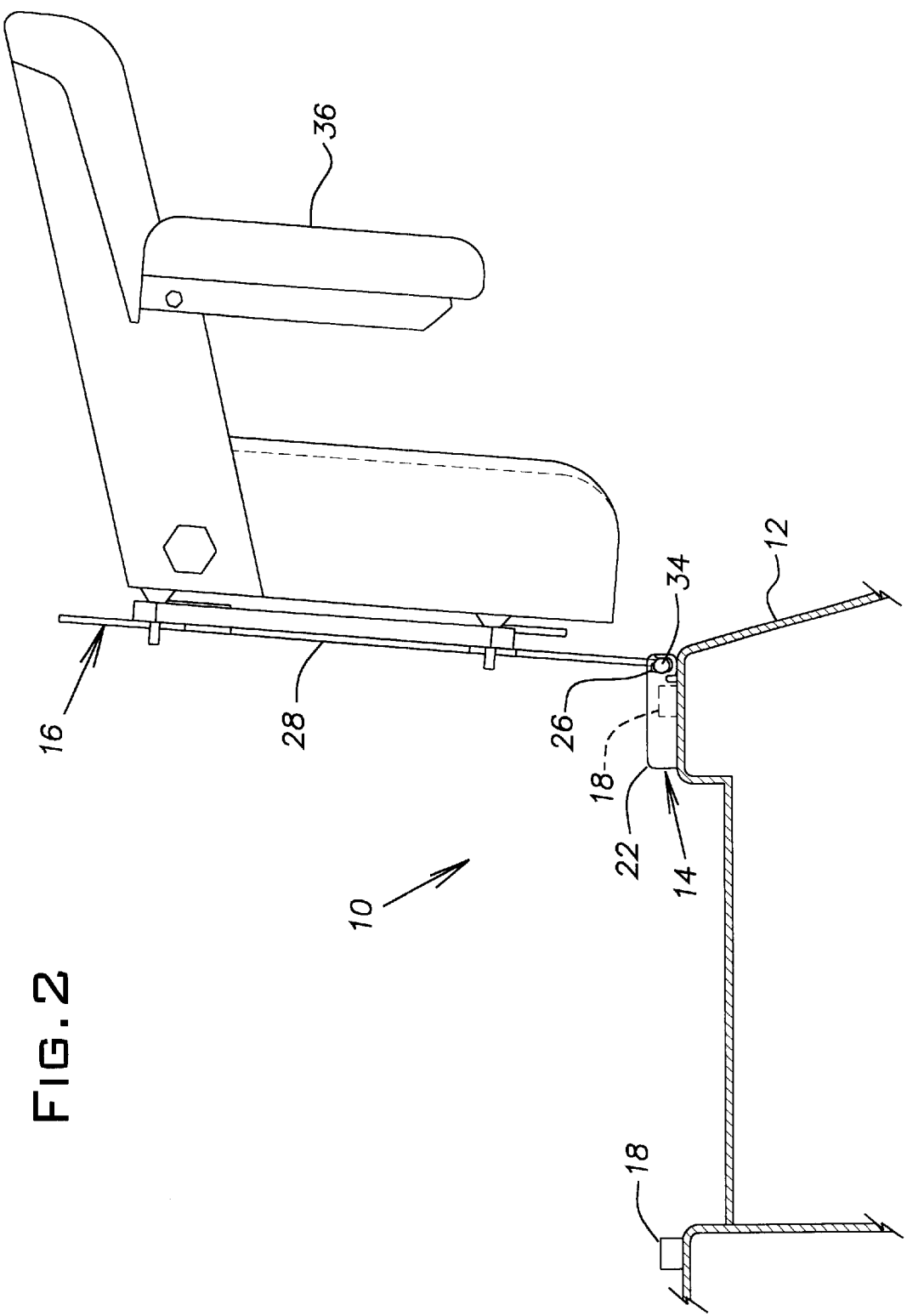
FIG. 2 is a side view of the anti-vibration seat in the lifted position according to the present invention.

FIGS. 1 and 2 illustrate an anti-vibration seat 10 for a mower, and particularly for a riding mower, according to the present invention. FIG. 1 shows the anti-vibration seat 10 in the sitting position, while FIG. 2 shows the anti-vibration seat 10 in the lifted position. The anti-vibration seat 10 includes a mower frame 12, bracket 14, seat frame 16, isolators 18 and seat 36.

Figure 3:
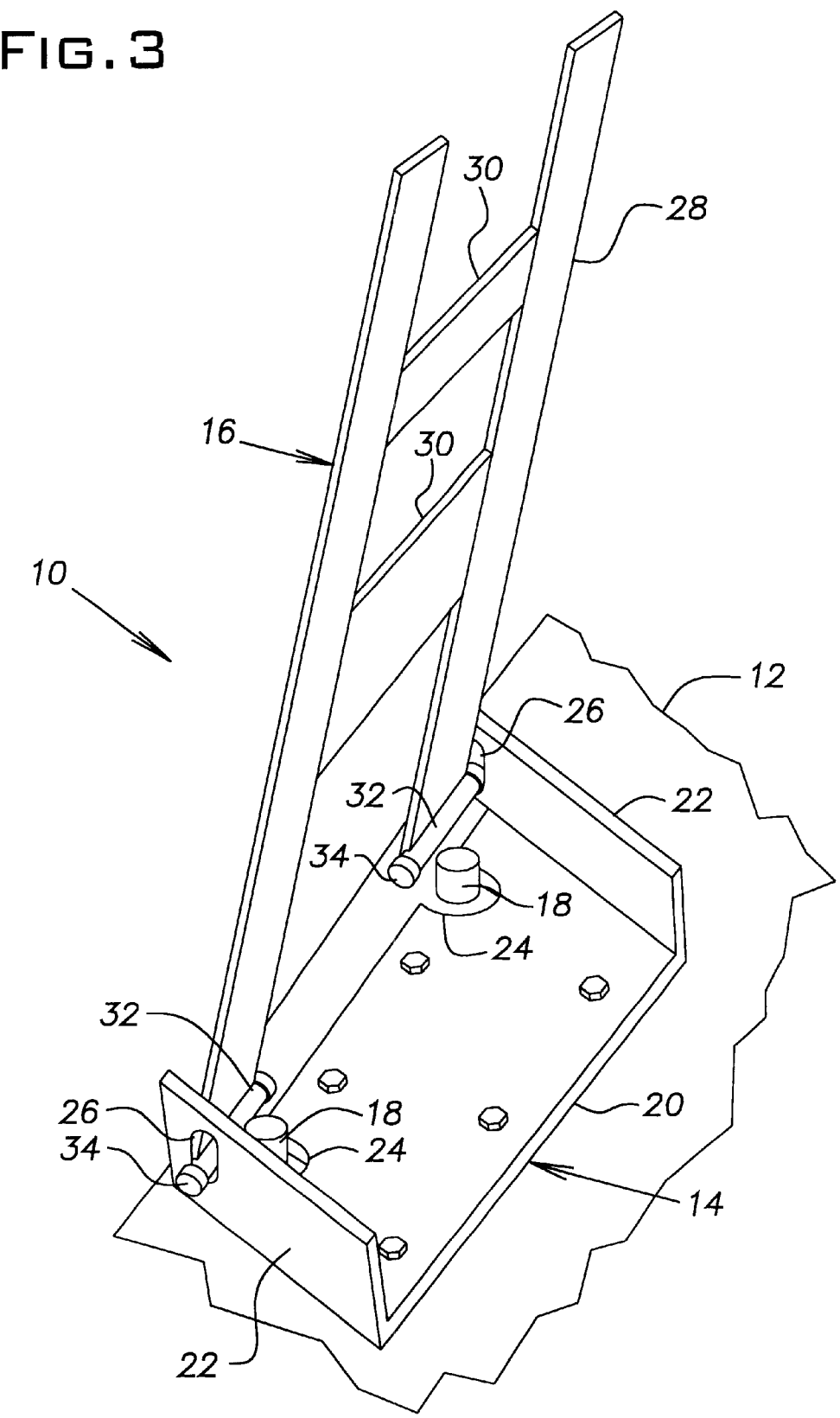
FIG. 3 is a perspective view of the anti-vibration seat frame in the lifted position according to the present invention.

Referring now to FIG. 3, the bracket 14 is made of a unitary piece of metal having a main plate 20 and a pair of upwardly bent side edges 22. The plate 20 is bolted to the top of the mower frame 12. Two semi-circle cutouts 24 are provided in the front edge of the plate 20. The side edges 22 project upwardly at a ninety-degree angle from the sides of the plate 20. A pivot slot 26, having a vertical major axis, is provided near the front of each side edge 22.

The seat frame 16 includes a pair of parallel support members 28 which extend from the front of the seat frame 16 to the back of the seat frame 16, and a pair of transverse members 30 integrally secured to the support members 28. A boss 32 is provided at one end of each support member 28. The boss 32 extends the width of the support member 28 and is generally cylindrically shaped with a longitudinal chamber extending through the boss 32. A nut and bolt assembly 34, provided through the chamber and the pivot slot 26, pivotally and slidably secures the seat frame 16 to the bracket 14. When the seat frame 16 is in the sitting position, the nut and bolt assembly 34 vertically floats within the pivot slot 26. As illustrated in FIGS. 1 and 2, a seat 36 is fixedly secured to the seat frame 16 by any suitable manner such as, for example, nut and bolt assemblies.

Isolators 18, preferably made of rubber, are fixedly secured to the mower frame 12 within the semi-circle cutouts 24 and secured to the rear end of the mower frame 12. As shown in FIG. 1, the front and rear ends of the support members 28 correspondingly engage the isolators 18. When the seat frame is in the down position, the support members 28 rest upon the isolators 18 so that the seat frame 16 is vertically spaced above the mower frame 12.

When operating the mower, vibrations in the mower frame 12 are not directly transferred to the seat frame 16. First, the nut and bolt assemblies 34 which secure the seat frame 16 to the bracket 14, float within, and do not engage, the pivot slot 26 in the vertical direction. Therefore, the vertical components of vibration in the mower frame are not transmitted to the seat frame 16. Second, isolators 18 separate the seat frame 16 from the mower frame 12. Hence, the isolators 18 dampen the vertical components of vibration in the mower frame 12 before those vibrations reach the seat frame 16.

Rotating the seat 36 about the nut and bolt assembly 34 can pivotally lift the mounted seat frame 16. When the seat 36 is raised, the seat frame 16 slides downward to the bottom of the pivot slot 26 allowing the seat 36 to hinge forward.

Although the invention has been shown and described with respect to certain embodiments, it is obvious that equivalent alterations and modifications will occur to others skilled in the art upon reading and understanding of the specification. The present invention includes all such equivalent alterations and modifications, and is limited only by the scope of the claims.

What is claimed is:

1. An anti-vibration seat for attachment to a mower frame, comprising:
   a bracket for attachment to the mower frame having a front and a rear segment;
   a seat frame pivotally and vertically slidably attached to said bracket providing pivotal and vertical sliding movements, the pivotal movement allowing movement of the seat from a sitting position to a raised position and the vertical sliding movement allowing movement of the seat frame in a single vertical direction during the vertical sliding movement;
   a seat fixedly secured to said seat frame; and
   means for dampening the vibration transmitted by said mower to said seat.

2. The invention as set forth in claim 1, wherein said bracket is made of a unitary piece of metal.

3. The invention as set forth in claim 1 or 2, wherein said bracket having a main plate with front, side and rear edges, further including bolts for bolting said main plate to said mower frame at said front and said rear segment.

4. The invention as set forth in claim 3, wherein said main plate has two semi-circle cutouts provided in the front edge of said main plate, said side edges projecting upwardly at a ninety degree angle to said front edge, said side edges containing a pivot slot.

5. The invention as set forth in claim 4, including means for fixedly securing said means for damping the vibration to the mower frame within said semi-circle cutouts provided in the front edge of the main plate of said bracket.

6. The invention as set forth in claim 3, wherein said seat frame has a front and back face including a pair of parallel support members which extend from the front face of said seat frame to the back face of said seat frame and a pair of transverse members integrally secured to said pair of parallel support members.

7. The invention as set forth in claim 6, wherein said means for damping the vibration between the seat frame and the mower frame are made of rubber and when said seat frame is in the down position, said support members rest upon said rubber such that said seat frame is vertically spaced above said mower frame.

8. An anti-vibration seat for attachment to a mower frame, comprising:
   a bracket for attachment to the mower frame having a front and a rear segment;
   a seat frame pivotally and slidably attached to said bracket;
   a seat fixedly secured to said seat frame; and
   means for damping the vibration transmitted by said mower to said seat;
   wherein said bracket having a main plate with front, side and rear edges, further including bolts for bolting said main plate to said mower frame at said front and said rear segment, said seat frame has a front and back face including a pair of parallel support members which extend from the front face of said seat frame to the back face of said seat frame and a pair of transverse members integrally secured to said pair of parallel support members, and a boss is provided at the front end of each pair of parallel support members, said boss extending the width of the support member and generally cylindrically shaped with a longitudinal chamber extending through said boss.

9. The invention as set forth in claim 8, wherein a nut and bolt assembly is provided through the chamber of said boss and through said pivot slot securing said seat frame, and consequently said seat, to said bracket.

10. The invention as set forth in claim 9, wherein the nut and bolt assembly vertically floats within said pivot slot when said seat is fixedly secured to said seat frame.

11. The invention as set forth in claim 1, including means for fixedly securing said means for damping the vibration to the mower frame.

12. The invention as set forth in claim 1, wherein said means for damping the vibration between the seat frame and the mower frame are made of rubber.

13. An anti-vibration seat for attachment to a mower frame, comprising:
   a bracket for attachment to the mower frame;
   a seat frame pivotally and vertically slidably attached to said bracket providing pivotal and vertical sliding movements, the pivotal movement allowing movement of the seat from sitting position to a raised position and the vertical sliding movement allowing movement of the seat frame in a single vertical direction during the vertical sliding movement:
   a seat fixedly secured to said seat frame; and
   isolators separating the mower frame from the seat frame and dampening the vibration transmitted to said seat by said mower through said seat frame.

14. The invention as set forth in claim 13, wherein said isolators between the seat frame and the mower frame are made of rubber.

15. The invention as set forth in claim 13, including means for fixedly securing said isolators to the mower frame.

16. The invention as set forth in claim 5, wherein said isolators between the seat frame and the mower frame are made of rubber and when said seat frame is in the down position, support members located on said seat frame rest upon said rubber such that said seat frame is vertically spaced above said mower frame.

17. The invention as set forth in claim 13, including means for fixedly securing said isolators to the mower frame within semi-circle cutouts provided in a front edge of a main plate of said bracket.

* * * * *

UNITED STATES PATENT AND TRADEMARK OFFICE
CERTIFICATE OF CORRECTION

PATENT NO. : 6,669,293 B2
DATED : December 30, 2003
INVENTOR(S) : Jeffrey J. Moore It is certified that error appears in the above-identified patent and that said Letters Patent is hereby corrected as shown below:

<u>Column 4,</u>
Line 45, please delete "claim 5", and insert therefor -- claim 15 --.

Signed and Sealed this

Thirteenth Day of July, 2004

JON W. DUDAS
*Acting Director of the United States Patent and Trademark Office*